United States Patent
Thomas et al.

(10) Patent No.: US 7,311,758 B2
(45) Date of Patent: Dec. 25, 2007

(54) METHOD OF PURIFYING A NATURAL GAS BY MERCAPTAN ADSORPTION

(75) Inventors: Michel Thomas, Lyons (FR); Eszter Toth, Lyons (FR); Fabrice Lecomte, Paris (FR); Géraldine Laborie, Courbevoie (FR); Chantal Rigaill, Yerres (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 427 days.

(21) Appl. No.: 11/106,504

(22) Filed: Apr. 15, 2005

(65) Prior Publication Data

US 2005/0229784 A1 Oct. 20, 2005

(30) Foreign Application Priority Data

Apr. 15, 2004 (FR) .................................. 04 04066

(51) Int. Cl.
*B01D 53/04* (2006.01)
*C07C 7/13* (2006.01)

(52) U.S. Cl. ..................... 95/122; 95/135; 208/208 R

(58) Field of Classification Search ................ 95/117, 95/121, 122, 123, 126, 135, 235, 236, 148; 423/228, 229, 242.1, 244.01; 208/208 R, 208/189, 250

See application file for complete search history.

(56) References Cited

U.S. PATENT DOCUMENTS

| | | | |
|---|---|---|---|
| 4,830,734 A * | 5/1989 | Nagji et al. ............. | 208/208 R |
| 4,957,715 A * | 9/1990 | Grover et al. .............. | 423/228 |
| 5,424,051 A * | 6/1995 | Nagji et al. ................. | 423/234 |
| 5,659,109 A * | 8/1997 | Fernandez de la Vega et al. ........................... | 585/834 |
| 7,192,565 B2 * | 3/2007 | Briot et al. .............. | 423/242.2 |

FOREIGN PATENT DOCUMENTS

| | | |
|---|---|---|
| FR | 2 052 692 | 4/1971 |
| GB | 1 554 206 A | 10/1979 |
| WO | WO 03/062177 A1 * | 7/2003 |

* cited by examiner

*Primary Examiner*—Frank M. Lawrence
(74) *Attorney, Agent, or Firm*—Antonelli, Terry, Stout & Kraus, LLP.

(57) ABSTRACT

The raw natural gas is deacidized and dehydrated in units DA and DH. The treated gas is then purified by adsorption of the mercaptans in first enclosure A1. Part of the purified gas is heated in E1, then fed into second enclosure A2 so as to discharge the water adsorbed by the adsorbent material contained in this second enclosure. A water-laden purge gas is fed into third enclosure A3 containing a mercaptan-laden adsorbent material. In A3, the mercaptans are desorbed and replaced by the water. The gas from the third enclosure is washed in unit L, then recycled.

14 Claims, 1 Drawing Sheet

METHOD OF PURIFYING A NATURAL GAS BY MERCAPTAN ADSORPTION

FIELD OF THE INVENTION

The present invention relates to purification of a natural gas. More particularly, the present invention provides a purification method using adsorption of a natural gas in order to reduce the mercaptan content.

A raw natural gas notably contains water, light hydrocarbons such as methane, ethane and propane, heavy hydrocarbons, acid compounds such as carbon dioxide ($CO_2$) and hydrogen sulfide ($H_2S$), and sulfur derivatives such as mercaptans. This raw natural gas has to be treated to meet the various specifications required, notably specifications relative to the acid gas content, the total sulfur content, and the water and hydrocarbon dew points.

BACKGROUND OF THE INVENTION

Raw natural gas can be treated by means of the methods described by documents FR-2,605,241 and FR-2,636,857. These methods use a physical solvent such as methanol for dehydration, gasoline extraction and removal of the acid compounds and of part of the mercaptans. After this treatment, the gas meets the specifications as regards the $CO_2$ content, typically below 2% by mole, and the $H_2S$ content, typically below 4 ppm by mole.

Another gas treatment solution consists in carrying out deacidizing by means of a method using an amine solvent. After this treatment, the gas meets the specifications relative to the $CO_2$ content, typically below 2% by mole, and the $H_2S$ content, typically below 4 ppm by mole, i.e. a total sulfur content of the order of 15 to 30 mg $S/Nm^3$. Part of the light mercaptans, notably methylmercaptan, is removed during this stage. On the other hand, the heavier mercaptans, such as ethyl-, propyl- and butyl-mercaptan, are not sufficiently acid to significantly react with the amines and therefore remain in the gas in a large proportion.

The gas is then dehydrated, for example by means of a method using a solvent such as glycol, for example the method described by document FR-2,740,468. Dehydration allows the water content of the gas to be lowered to a value close to 60 ppm by mole.

Besides, a TSA (Thermal Swing Adsorption) type adsorption method on a molecular sieve, for example of 3, 4A or 13X type, or on silica gel or alumina, can be used. In this case, the water content of the gas is typically below 1 ppm by mole.

The aforementioned methods allow to obtain a natural gas whose water, acid compound and heavy hydrocarbon contents meet the commercial requirements. However, the methyl- and ethyl-mercaptans still remain predominantly in the gas, in proportions that can reach 200 ppm or more in sulfur equivalent. For certain uses, these mercaptan proportions are too high.

One object of the present invention is to provide a natural gas purification method in order to obtain a mercaptan molar content below 20 ppm.

It is possible to use a removal method using mercaptan adsorption. The conventional gas phase adsorption methods are the methods commonly referred to as TSA (Thermal Swing Adsorption) wherein the adsorption stage takes place at ambient or moderate temperature typically ranging between 20° C. and 60° C., and the desorption (or regeneration) stage at a high temperature typically ranging between 200° C. and 350° C., in a purge gas sweep stream (in general part of the purified gas containing methane and/or ethane) whose flow rate also ranges between 5% and 20% of the flow of feed gas. The desorption gas containing a large amount of mercaptans then has to be treated prior to being recycled, for example by contacting with a basic solution (soda or potash), or it can be sent to the flare, which is neither economically nor ecologically advantageous. The pressure is either kept substantially constant throughout the cycle, or lowered during the regeneration stage so as to favour regeneration. After this stage of purification by adsorption, the water content of the gas is below 1 ppm by mole, and the gas meets the total sulfur requirements.

However, adsorption of the mercaptans by means of a conventional TSA method used in the industry, notably to purify a natural gas, has several drawbacks. The following can be mentioned in particular:

necessity to heat to high temperatures, which leads to premature aging of the adsorbent material, notably during the desorption of thermally fragile products (under the effect of the thermal treatments regularly applied during the adsorbent material regeneration stage, the mercaptans can form reactive compounds and react with the co-adsorbed hydrocarbons so as to eventually lead to premature aging of the adsorbent material, which may require frequent renewal thereof, and thus an additional cost), use of a large amount of purge gas, generally ranging between 5% and 20% of the flow of gas to be treated, necessity to treat the purge gas containing the desorbed products and to recycle the purge gas.

The present invention provides a method of purifying a natural gas by mercaptan adsorption, avoiding the drawbacks of the methods from the prior art.

SUMMARY OF THE INVENTION

The present invention relates to a method of purifying a natural gas containing mercaptans. The method comprises the following stages:

a) removing the mercaptans from said gas by contacting with a first amount of adsorbent material, so as to obtain a purified gas, b) contacting part of the purified gas obtained in stage a) with a water-laden second amount of adsorbent material, in order to discharge the water therefrom, c) contacting a gas fraction comprising water with a mercaptan-laden third amount of adsorbent material, in order to displace the mercaptans by water.

According to the invention, stage a) can be carried out at a pressure ranging between 1 MPa and 10 MPa, and at a temperature ranging between 0° C. and 100° C.

In stage b), said part of the purified gas can make up between 1% and 50% by volume of said purified gas obtained in stage a).

Stage b) can be carried out at a pressure ranging between 0.5 MPa and 10 MPa, and at a temperature ranging between 100° C. and 400° C.

In stage c), the water content of the gas fraction can range between 1000 ppm and 30,000 ppm.

Stage c) can be carried out at a pressure ranging between 0.5 MPa and 10 MPa, and at a temperature ranging between 15° C. and 250° C.

According to the invention, the following stages can also be carried out:

d) prior to stage a), dehydrating said gas by contacting with a fourth amount of adsorbent material, e) contacting a second part of the purified gas obtained in stage a) with a water-laden fifth amount of adsorbent material in order to discharge the water.

According to the invention, stage d) can be carried out at a pressure ranging between 1 MPa and 10 MPa, and at a temperature ranging between 0° C. and 100° C.

Stage e) can be carried out at a pressure ranging between 0.5 MPa and 10 MPa, and at a temperature ranging between 100° C. and 400° C.

According to the invention, after a predetermined time, in stage a), the mercaptans can be removed from said gas by contacting with the second amount of adsorbent material, in stage b), part of the purified gas obtained in stage a) can be contacted with the third amount of adsorbent material, and in stage c), the gas fraction comprising water can be contacted with the first amount of adsorbent material.

Furthermore, after a predetermined time, in stage d), said gas can be dehydrated by contacting with the fifth amount of adsorbent material, and in stage e), the second part of the purified gas can be contacted with the fourth amount of adsorbent material.

In this case, the adsorbent material making up the fourth and the fifth amount can have a higher affinity towards water than the material making up the first, the second and the third amount.

According to the invention, alternatively, after a predetermined time, in stage a), the mercaptans can be removed from said gas by contacting with the fifth amount of adsorbent material, in stage b), part of the purified gas obtained in stage a) can be contacted with the third amount of adsorbent material, in stage c), the gas fraction comprising water can be contacted with the first amount of adsorbent material, in stage d), said gas can be dehydrated by contacting with the second amount of adsorbent material, and in stage e), the second part of the purified gas can be contacted with the fourth amount of adsorbent material.

According to the invention, the gas fraction can comprise part of a water-laden gas obtained in stage b).

Furthermore, the following stage can be carried out:

f) prior to stage a), deacidizing said natural gas.

In stage c), the gas fraction can comprise part of the deacidized gas obtained in stage f).

According to the invention, the mercaptan-laden gas obtained in stage c) can be washed with a mercaptan-absorbent solution, then the washed gas can be recycled.

The adsorbent material making up said first, second, third, fourth and fifth amounts can comprise at least one of the following materials : a zeolite, an activated alumina type mesoporous adsorbent, and a silica gel type mesoporous adsorbent. For example, the adsorbent material can be: a type A zeolite, a faujasite X type zeolite, a faujasite Y type zeolite, an activated alumina type mesoporous adsorbent having a BET specific surface area ranging between 150 $m^2/g$ and 800 $m^2/g$, and a silica gel type mesoporous adsorbent having a BET specific surface area ranging between 150 $m^2/g$ and 800 $m^2/g$.

The stage of displacement by water of the adsorbed mercaptans, at ambient or moderate temperature, allows to reduce the cycle times, the amount of adsorbent material required and the purge gas flow rate, and to increase the life of the adsorbent material.

BRIEF DESCRIPTION OF THE FIGURES

Other features and advantages of the invention will be clear from reading the description hereafter, given by way of non limitative example, with reference to the accompanying drawings wherein.

DETAILED DESCRIPTION

Figure 1:
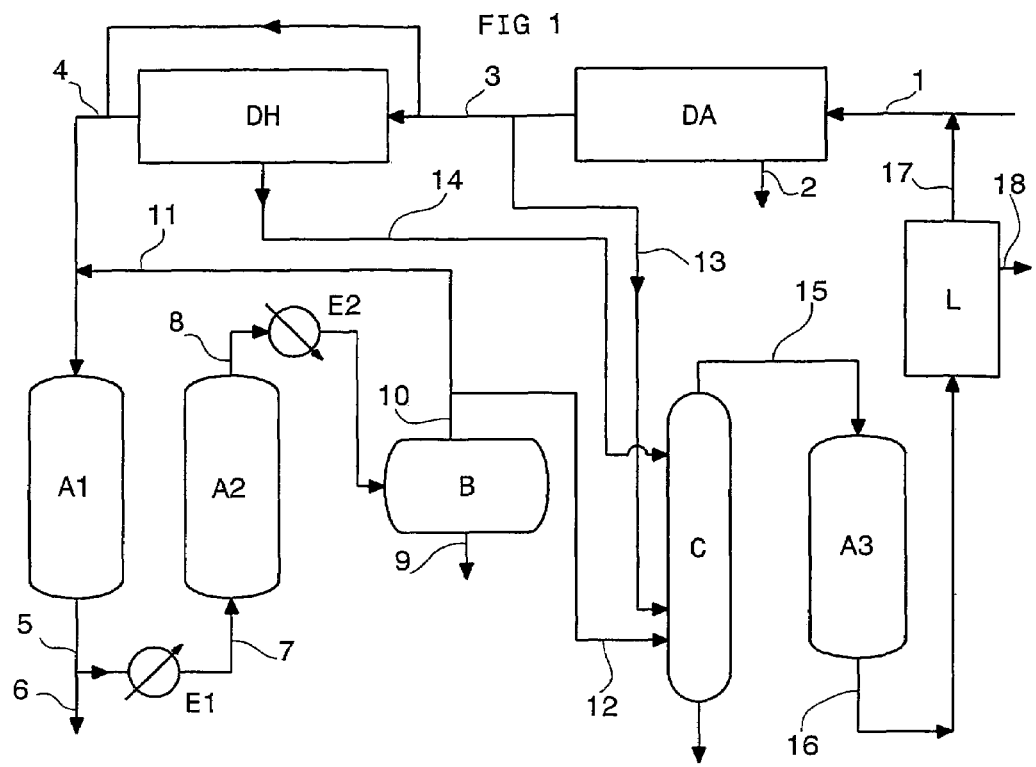
FIG. 1 describes the method according to the invention.

In FIG. 1, the natural gas to be treated flows in through line 1 and it notably contains water, $CO_2$, $H_2S$ and mercaptans. The gas can be a raw natural gas directly coming from an oilwell or from a gas field.

The gas circulating in line 1 can be fed into deacidizing unit DA. The gas is deacidized by means of methods known to the man skilled in the art. For example, the gas is treated by means of a method using chemical and/or physical solvents, for example based on amines and/or methanol, so as to produce a natural gas meeting the $CO_2$ and $H_2S$ content requirements. Such methods are notably described by documents FR-2,605,241, FR-2,636,857, FR-2,734,083. The acid compounds $CO_2$ and $H_2S$ are discharged through line 2. Part of the mercaptans, notably the methylmercaptan, is partly removed from the gas during this treatment. These mercaptans are also discharged through line 2. The gas discharged through line 3 of unit DA has a $H_2S$ content for example of the order of 4 ppm by mole and a $CO_2$ content below 2% by mole for example. According to the temperature and pressure conditions, the water content of this gas generally ranges between 1000 ppm and 5000 ppm by mole.

The deacidized gas circulating in line 3 can then be sent to dehydration unit DH. The gas is treated by means of a dehydration method, with a glycol solution for example. For example, the dehydration method is the method described by document FR-2,740,468. The glycol used can be triethylene glycol (TEG). At the outlet of this unit DH, a dehydrated gas whose residual water content can be of the order of 60 ppm by mole is obtained. This gas still contains mercaptans and heavy hydrocarbons. The water is discharged through line 14.

The treated gas flowing from unit DH through line 4 is depleted in water and in acid compounds $CO_2$ and $H_2S$, but it still contains mercaptans, in proportions that can be above 200 ppm by mole in sulfur equivalent.

The gas circulating in line 3 can be directly transferred to line 4.

The dehydrated and deacidized gas is then sent to a purification unit using adsorption on an adsorbent material, for example on molecular sieves, in order to remove the mercaptans still present in this gas. This unit comprises at least three enclosures A1, A2 and A3 containing a suitable adsorbent material allowing notably adsorption of mercaptans such as methyl-, ethyl-, propyl-mercaptan, and the higher mercaptans. Enclosures A1, A2 and A3 containing the adsorbent material work alternately in adsorption, displacement and regeneration mode:

in adsorption mode, the adsorbent material adsorbs the mercaptans contained in the gas, and possibly the water and the heavy hydrocarbons, at ambient or moderate temperature, in displacement mode, displacement of the mercaptans and possibly of the heavy hydrocarbons adsorbed in the adsorption mode is carried out; the mercaptans are displaced by the water, i.e. desorbed and replaced by water, displacement being performed by a sweep stream of a gas containing water at ambient or moderate temperature, in regeneration mode, desorption of the water adsorbed by the adsorbent material is carried out by a sweep stream of a gas at high temperature.

In FIG. 1, the adsorbent material contained in enclosure A1 works in adsorption mode, the material contained in enclosure A2 works in regeneration mode and the material contained in enclosure A3 works in displacement mode.

The dehydrated and deacidized gas circulating in line 4 is fed into enclosure A1. The mercaptans contained in the gas are adsorbed by the adsorbent material contained in enclosure A1. The water possibly present in the gas can also be adsorbed. As a result of the affinity difference of the various components towards the adsorbent material, the water which has the highest affinity towards adsorbents of hydrophilic nature, notably of zeolite, alumina or silica type, is adsorbed in a zone close to the inlet of enclosure A1. The mercaptans and possibly the heavy hydrocarbons, notably $C_6^+$, are adsorbed in the central zone of enclosure A1. A purified gas meeting the requirements relative to acid gas, total sulfur and water contents is obtained at the outlet of enclosure A1. The purified gas is discharged from enclosure A1 through line 5.

The purified gas is obtained as long as the cycle time is less than the mercaptan breakthrough time, i.e. adsorption is carried out in enclosure A1 for example until the material is saturated with mercaptans. The operating mode of the material of enclosure A1 is then replaced by that of another enclosure, for example enclosure A2 whose adsorbent material is regenerated, i.e. it comprises no or few adsorbed mercaptans and water.

The temperature inside enclosure A1 working in adsorption mode generally ranges between 0° C. and 100° C., advantageously between 20° C. and 80° C., preferably between 40° C. and 70° C. The pressure in enclosure A1 can be the pressure of the natural gas produced, typically ranging between 1 MPa and 10 MPa, preferably between 3 MPa and 8 MPa.

The purified gas is for example sent through line 6 into a fractionating unit in order to upgrade the various cuts, by distillation for example. It is possible to separate the purified gas to obtain methane, ethane, propane, butane and a heavy hydrocarbon cut containing more than five carbon atoms. The purified gas can also be sent through line 6 to a place where it is stored or used.

In enclosure A2, the adsorbent material is laden with water. According to the invention, part of the purified gas from enclosure A1 is used as regeneration gas to regenerate the material contained in enclosure A2, i.e. to discharge the water contained in the material in enclosure A2. Regeneration is carried out in TSA mode. Part of the purified gas from enclosure A1 is heated in heat exchanger E1 to a temperature ranging between 100° C. and 400° C., preferably between 200° C. and 350° C., then fed through line 7 into enclosure A2. The flow of gas fed into enclosure A2 can range between 1% and 50%, preferably between 5% and 20% of the total flow of purified gas from enclosure A1. In enclosure A2, the pressure generally ranges between 0.5 MPa and 10 MPa, preferably between 1 MPa and 7 MPa, the temperature can range between 100° C. and 400° C., preferably between 200° C. and 350° C.

At the outlet of enclosure A2, the purified gas circulating in line 8 is laden with water from the desorption of the adsorbed water. The gas is cooled in heat exchanger E2 to a temperature ranging between 15° C. and 150° C., preferably between 25° C. and 80° C. Cooling, allows to condense part of the water contained in the gas. The cooled gas is fed into gas/liquid separator B in order to recover part of the water condensed by cooling.

The working conditions of separator B are a temperature ranging between 15° C. and 150° C., preferably between 25° C. and 80° C., and a pressure ranging between 0.5 MPa and 10 MPa, preferably between 1 MPa and 7 MPa. The condensed water is discharged from B through line 9, the gas is discharged from B through line 10.

Part or all of the gas discharged from B can be recycled. For example, this gas is sent through line 11 to be mixed with the gas circulating in line 4, then to be fed into enclosure A1.

The adsorbent material contained in enclosure A3 is laden with mercaptans. The material can also be laden, in addition to the mercaptans, with water and/or heavy hydrocarbons, notably of $C_6^+$ type. A purge gas containing water is used to displace notably the mercaptans. This gas is fed through line 15 into enclosure A3.

The purge gas can be part of the gas obtained at the outlet of separator B. This gas circulating in line 12 can be contacted with water in contactor C, then it is fed through line 15 into enclosure A3. The purge gas can also be part of the deacidized gas obtained at the outlet of deacidizing unit DA. This gas discharged through line 13 can be contacted with water in contactor C, then it is fed through line 15 into enclosure A3. The advantage of discharging the purge gas at the outlet of DA is that this gas is highly water-laden, generally between 1000 and 5000 ppm by mole depending on the operating pressure and temperature conditions in unit DA. Consequently, a lower flow rate is sufficient to displace the mercaptans adsorbed in enclosure A3.

The water contacted with the purge gas is fed through line 14 into contactor C. For example, this water comes from dehydration unit DH, from separator B or from another source.

The pressure and temperature conditions in gas/liquid contactor C for lading the purge gas with water are preferably so selected that the relative pressure of the water in enclosure A3 is below 1, preferably below 0.8 so as to limit the capillary condensation phenomenon in the adsorbent mesopores. The pressure in contactor C can range between 0.5 MPa and 10 MPa, preferably between 1 MPa and 8 MPa. The temperature in contactor C can be selected at most equal to the displacement temperature in enclosure A3 in displacement mode, and preferably lower, by some degrees, than the temperature used during the displacement stage, so that the relative pressure of the water in the purge gas is below 1. For example, the temperature in contactor C ranges between 15° C. and 150° C., preferably between 25° C. and 100° C. Thus, the water content of the purge gas circulating in line 15 ranges for example between 1000 and 30,000 ppm by mole, depending on the operating conditions in contactor C.

The operating conditions in enclosure A3, i.e. approximately the temperature and the pressure of the purge gas fed into A3, can be a temperature ranging between 15° C. and 250° C., preferably between 25° C. and 100° C., and a pressure ranging between 0.5 MPa and 10 MPa, preferably between 1 MPa and 7 MPa. The flow of purge gas can range between 1% and 50%, preferably between 2% and 30% by volume of the gas flowing in through line 1.

The function of water as the displacement agent is to substitute, in the adsorbent material, for the adsorbed mercaptans, which are released and discharged with the purge gas through line 16. A purge gas containing a large amount of desorbed mercaptans, typically at a concentration that is 2 to 20 times as high as the mercaptan concentration in the gas to be treated and flowing in through line 1, is collected through line 16 at the outlet of enclosure A3.

In enclosure A3, the purge gas being free of or depleted in mercaptans, an equilibrium is established between the adsorbed mercaptans and this gas, which leads to partial desorption of the adsorbed mercaptans in enclosure A3. Because of the nature of the adsorption isotherms of the mercaptans, a very large amount of gas would be necessary for significant desorption of the mercaptans at moderate temperature, between 0° C. and 150° C. The use, according to the invention, of a displacement agent such as water has the advantage of favouring exchange between desorption of the mercaptans and adsorption of the displacement agent on the adsorbent material. At the outlet of enclosure A3, the purge gas is enriched in mercaptans and contains only a small amount of water. The amount of purge gas required for desorption of the mercaptans varies notably depending on the water content in the purge gas. A high water content allows to significantly reduce the amount of purge gas required to release the mercaptans adsorbed by the adsorbent material in enclosure A3. The relative affinity of the water towards the adsorbent material, in relation to that of the mercaptans, is also a parameter allowing to reduce the amount of purge gas to be used.

The gas leaving enclosure A3 through line 16 is laden with mercaptans. This gas can be treated in washing unit L in order to remove to the maximum the mercaptans, for example by cooling and/or by washing with an alkaline soda or potash solution, and/or with a physical solvent such as an alcohol or a glycol ether. The mercaptans are discharged through line 18. Then, the washed gas can be sent back through line 17 with the raw natural gas to be treated. The washed gas may not be subjected to the deacidizing treatment in unit DA and, possibly, the dehydration treatment carried out in unit DH. Thus, the washed gas is mixed with either the raw gas circulating in line 1, and/or with the deacidized gas circulating in line 3 (alternative not shown in FIG. 1), and/or with the deacidized and dehydrated gas circulating in line 4 (alternative not shown in FIG. 1).

According to the method described in connection with FIG. 1, enclosures A1, A2 and A3 work alternately in adsorption mode (adsorption of the mercaptans contained in the gas to be treated), then in displacement mode (displacement of the adsorbed mercaptans by water), then in regeneration mode (desorption of the water).

After a predetermined time, the operating mode of the material of enclosure A1 is replaced by that of enclosure A3, the mode of enclosure A2 is replaced by that of enclosure A1, and the mode of enclosure A3 is replaced by that of enclosure A2. The change can be performed when the material contained in the enclosure working in regeneration mode is sufficiently regenerated to work in adsorption mode. The change can also be performed when the material contained in the enclosure working in adsorption mode is too mercaptan-laden to be still able to provide purification of the gas to be treated.

Figure 2:
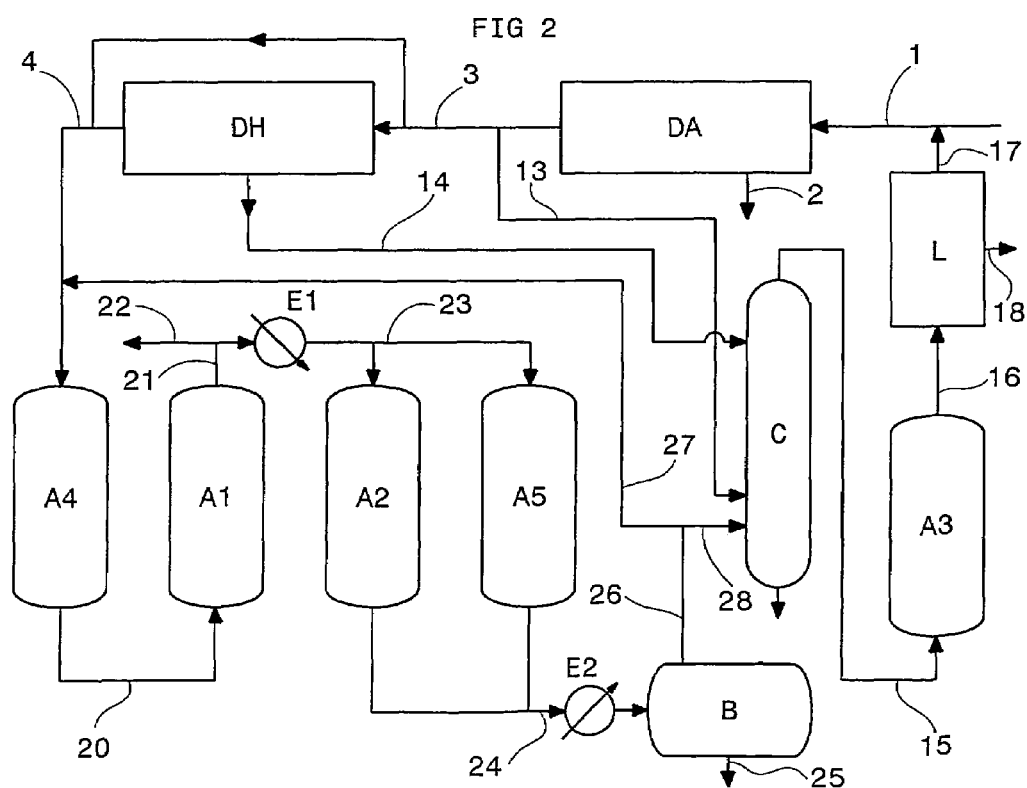
FIG. 2 shows a variant of the method according to the invention.

The method described in connection with FIG. 2 is an improvement of the method described in connection with FIG. 1. The reference numbers of FIG. 2 identical to those of FIG. 1 designate the same elements.

The raw natural gas flowing in through line 1 is possibly deacidized in unit DA, then possibly dehydrated in unit DH.

The deacidized and dehydrated natural gas is fed into a purification unit. This unit comprises at least five enclosures A1, A2, A3, A4 and A5 working in parallel:

- a first enclosure works in adsorption mode, notably for the residual water present in the gas after deacidizing and dehydration, adsorption being carried out at ambient or moderate temperature,
- a second enclosure works in adsorption mode, notably for the mercaptans and the heavy hydrocarbons present in the gas from the first enclosure, adsorption being carried out at ambient or moderate temperature,
- the third and fourth enclosures work in regeneration mode, i.e. desorption of the water by sweeping with a gas at high temperature,
- a fifth enclosure works in displacement mode, notably for the adsorbed mercaptans and hydrocarbons, by sweeping with a purge gas containing water, the gas being at ambient or moderate temperature.

In FIG. 2, the material contained in enclosure A4 works in water adsorption mode, the material contained in enclosure A1 works in mercaptan adsorption mode, the material contained in enclosures A2 and A5 works in regeneration mode, and the material contained in enclosure A3 works in displacement mode.

The dehydrated and deacidized gas circulating in line 4 is fed into enclosure A4. The water contained in the gas is adsorbed by the adsorbent material contained in enclosure A4.

The gas coming from enclosure A4 through line 20 is fed into enclosure A1. The mercaptans and possibly heavy $C_6^+$ hydrocarbons contained in the gas are adsorbed by the adsorbent material contained in enclosure A1. A purified natural gas meeting the requirements as regards acid gas and total sulfur contents, as well as water dew point, is discharged from enclosure A1 through line 21.

In enclosures A1 and A4, the pressure generally ranges between 1 MPa and 10 MPa, preferably between 3 MPa and 8 MPa, and the temperature can range between 0° C. and 100° C., preferably between 20° C. and 80° C.

Dimensioning of enclosures A1 and A4 can be done considering the total amount of mercaptans and of heavy hydrocarbon compounds to be adsorbed in enclosure A1. The residual water content in the gas can be adjusted so as to saturate with water the adsorbent material of enclosure A4 during a cycle time identical to that of the mercaptan saturation of the adsorbent material of enclosure A1.

The purified gas is for example sent through line 22 to a fractionating unit in order to upgrade the various cuts, by distillation for example. The purified gas can also be sent through line 22 to a place where it is stored or used.

The adsorbent material contained in enclosures A2 and A5 is laden with water. According to the invention, part of the purified gas, for example between 1% and 50%, preferably between 5% and 20% by volume in relation to the total amount of purified gas is used as regeneration gas to regenerate the adsorbent material contained in enclosures A2 and A5.

This part of the purified gas from enclosure A1 is heated in heat exchanger E1 to a temperature ranging between 100° C. and 400° C., preferably between 200° C. and 350° C. Then the heated gas is fed into enclosures A2 and A5 through line 23. For example, the enclosures are arranged in parallel, the hot gas is divided into two streams, each stream flowing into one of the enclosures.

In enclosures A2 and A5, the pressure generally ranges between 0.5 MPa and 10 MPa, preferably between 1 MPa and 7 MPa.

The regeneration gas discharged from enclosures A2 and A5 through line 24 is laden with water from desorption of the water contained in the adsorbent material of enclosures A2 and A5. This gas is cooled in heat exchanger E2 to a temperature ranging between 15° C. and 150° C., preferably between 25° C. and 80° C.

The cooled gas is fed into gas/liquid separator B in order to recover the water condensed during cooling. The operating conditions in separator B can be a temperature ranging between 15° C. and 150° C., preferably between 25° C. and 80° C., a pressure ranging between 0.5 MPa and 10 MPa, preferably between 1 MPa and 7 MPa. The condensed water is discharged from B through line 25, the gas is discharged from B through line 26.

Part or all of the gas discharged from B can be recycled. For example, this gas is sent through line 27 to be mixed with the gas circulating in line 4, then to be fed into enclosure A4.

The adsorbent material contained in enclosure A3 is notably laden with mercaptans. The material can also be laden with heavy $C_6^+$ hydrocarbons. A purge gas containing water is used to displace notably the mercaptans. This gas is fed through line 15 into enclosure A3.

The purge gas can be part of the gas obtained at the outlet of separator B. This gas circulating in line 28 can be contacted with water in contactor C, then it is fed through line 15 into enclosure A3. The purge gas can also be part of the deacidized gas obtained at the outlet of deacidizing unit DA. This gas discharged through line 13 can be contacted with water in contactor C, then it is fed through line 15 into enclosure A3. The water contacted with the purge gas is fed through line 14 into contactor C. For example, this water comes from dehydration unit DH, from separator B or from another source.

The pressure and temperature conditions in gas/liquid contactor C for lading the purge gas with water are preferably so selected that the relative pressure of the water in enclosure A3 is below 1, preferably below 0.8 so as to limit the capillary condensation phenomenon in the adsorbent mesopores. The pressure in contactor C can range between 0.5 MPa and 10 MPa, preferably between 1 MPa and 8 MPa. The temperature in contactor C can be selected at most equal to the displacement temperature in enclosure A3 in displacement mode, and preferably lower, by some degrees, than the temperature used during the displacement stage, so that the relative pressure of the water in the purge gas is below 1. For example, the temperature in contactor C ranges between 15° C. and 150° C., preferably between 25° C. and 100° C. Thus, the water content of the purge gas circulating in line 15 ranges for example between 1000 and 30,000 ppm by mole, depending on the operating conditions in contactor C.

The operating conditions in enclosure A3, i.e. approximately the temperature and the pressure of the purge gas fed into A3, can be a temperature ranging between 15° C. and 250° C., preferably between 25° C. and 100° C., and a pressure ranging between 0.5 MPa and 10 MPa, preferably between 1 MPa and 7 MPa. The flow of purge gas can range between 1% and 50%, preferably between 2% and 20% by volume of the gas flowing in through line 1.

The gas coming from enclosure A3 through line 16 is laden with mercaptans. This gas can be treated in washing unit L in order to remove to the maximum the mercaptans, for example by cooling and/or by washing with an alkaline soda or potash solution, and/or with a physical solvent such as an alcohol or a glycol ether. The mercaptans are discharged through line 18. Then, the washed gas can be sent back through line 17 with the raw natural gas to be treated. The washed gas can be mixed with either the raw gas circulating in line 1, or with the deacidized raw gas circulating in line 3, or with the deacidized and dehydrated raw gas circulating in line 4.

According to the method described in connection with FIG. 2, enclosures A1, A2, A3, A4 and A5 work alternately in adsorption mode, in displacement mode and/or in regeneration mode.

According to a first embodiment of the invention, the adsorbent materials contained in each enclosure A1, A2, A3, A4 and A5 can be successively subjected to the following operating modes:
   adsorption of the water present in the dehydrated gas,
   desorption of the water adsorbed at high temperature after the previous adsorption stage,
   adsorption of the mercaptans and possibly of part of the heavy hydrocarbons adsorbed by the water contained in the dehydrated gas,
   displacement of the mercaptans and possibly of the heavy hydrocarbons adsorbed by the water contained in the regeneration gas,
   desorption of the water adsorbed, at high temperature after the displacement stage.

In connection with FIG. 2, this sequence is translated into the replacement, after a predetermined time, of the operating mode of enclosure A5 by that of enclosure A1, that of enclosure A1 by that of enclosure A3, that of enclosure A3 by that of enclosure A2, that of enclosure A2 by that of enclosure A4, that of enclosure A4 by that of enclosure A5.

According to a second embodiment of the invention, the two amounts of adsorbent material contained in two enclosures work alternately and the three amounts of adsorbent material of the other three enclosures work alternately.

In connection with FIG. 2, the two enclosures A4 and A5 working alternately can be successively subjected to the following operating modes:
   adsorption of the water present in the dehydrated gas,
   desorption of the water adsorbed at high temperature after the previous adsorption stage.

This sequence is translated into the replacement, after a predetermined time, of the operating mode of the material of enclosure A5 by that of enclosure A4, and that of enclosure A4 by that of enclosure A5.

In connection with FIG. 2, the three enclosures A1, A2 and A3 working alternately can be successively subjected to the following operating modes:
   adsorption of the mercaptans and possibly of part of the heavy hydrocarbons adsorbed by the water contained in the dehydrated gas,
   displacement of the mercaptans and possibly of the heavy hydrocarbons adsorbed by the water contained in the regeneration gas,
   desorption of the water adsorbed, at high temperature after the displacement stage.

This sequence is translated into the replacement, after a predetermined time, of the operating mode of the material of enclosure A1 by that of enclosure A3, that of enclosure A2 by that of enclosure A1, that of enclosure A3 by that of enclosure A2.

Advantageously, according to the second embodiment of the invention, a specific adsorbent material can be selected for adsorption of the water in enclosures A4 and A5, and a specific adsorbent material can be selected for adsorption of the mercaptans and of the heavy hydrocarbons in enclosures A1, A2 and A3.

Furthermore, the second embodiment of the invention allows to adjust the cycle time, i.e. the duration of a sequence, of enclosures A4 and A5 differently from the cycle time of enclosures A1, A2 and A3.

For the methods described in connection with FIGS. 1 and 2, the duration of a sequence or cycle time, i.e. the operating time of the method between two adsorbent material permutations between the enclosures, can range between 4 and 24 hours, preferably between 6 and 18 hours, advantageously between 8 and 12 hours.

Dimensioning of the enclosures is performed according to rules known to the man skilled in the art.

The surface velocity of the gas in the adsorbent material can range between 1 and 30 m/min.

According to the invention, the adsorbent materials contained in enclosures A1, A2, A3, A4 and A5 of FIGS. 1 and/or 2 are preferably selected from among the molecular sieves, also referred to as zeolites, or activated alumina or silica gel type mesoporous adsorbents.

Among the zeolites, type A (LTA family), type X or Y (FAU faujasite family) or type MFI (ZSM-5 and silicalite) zeolites, whose pore size is compatible with the size of the mercaptans to be adsorbed, can be selected.

A 4A or NaA zeolite, or preferably a 5A or CaA zeolite, whose Na/Ca exchange rate ranges between 25% and 85% by mole, can be selected from among the A (LTA) family zeolites. It is possible to select, from the type X or Y (FAU faujasites) zeolites, a type 13X or NaX zeolite, but other exchange cations can also be used, alone or in admixture, such as for example Ca, Ba, Li, Sr, Mg, Rb, Cs, Cu, Ag . . . . Among the type Y zeolites, the NaY form can be selected, but it is also possible to use the following cations: Ca, Ba, Li, Sr, Mg, Rb, Cs, Cu, Ag . . . . For the type Y zeolites, the silicon/aluminium ratio can range between 2.5 and infinity, what is referred to as infinity is understood to be the dealuminized Y zeolites. The ZSM-5 zeolites whose Si/Al ratio ranges from 1 to infinity (silicalite in the latter case) can be selected from among the type MFI zeolites.

Selection of the zeolite is guided by the composition of the gas to be treated, the presence of big molecules (aromatics or iso-paraffins for example) to be adsorbed, requiring a sufficiently open zeolite, preferably of type X or Y, i.e. a faujasite.

The other adsorbent materials that can be used can be selected from activated aluminas or silica gels, preferably those having a BET specific surface area conventionally determined by physisorption of nitrogen at 77K, ranging between 150 and 800 m$^2$/g.

The adsorbent materials are preferably used in fixed beds, for example in form of balls or of extruded material. They can be used either alone or in admixture, for example in multibed form.

The invention claimed is:

1. A method of purifying a natural gas containing mercaptans, comprising the following stages:
    a) removing the mercaptans from said gas by contacting with a first amount of adsorbent material, so as to obtain a purified gas,
    b) contacting part of the purified gas obtained in stage a) with a water-laden second amount of adsorbent material, in order to discharge the water therefrom,
    c) contacting a gas fraction comprising water with a mercaptan-laden third amount of adsorbent material, in order to displace the mercaptans by water.

2. A method as claimed in claim 1, wherein:
    stage a) is carried out at a pressure ranging between 1 MPa and 10 MPa, and at a temperature ranging between 0° C. and 100° C.,
    in stage b), said part of the purified gas makes up between 1% and 50% by volume of said purified gas obtained in stage a),
    stage b) is carried out at a pressure ranging between 0.5 MPa and 10 MPa, and at a temperature ranging between 100° C. and 400° C.,
    in stage c), the water content of the gas fraction ranges between 1000 ppm and 30,000 ppm,
    stage c) is carried out at a pressure ranging between 0.5 MPa and 10 MPa, and at a temperature ranging between 15° C. and 250° C.

3. A method as claimed in claim 1, wherein the following stages are also carried out:
    d) prior to stage a), dehydrating said gas by contacting with a fourth amount of adsorbent material,
    e) contacting a second part of the purified gas obtained in stage a) with a water-laden fifth amount of adsorbent material in order to discharge the water.

4. A method as claimed in claim 3, wherein:
    stage d) is carried out at a pressure ranging between 1 MPa and 10 MPa, and at a temperature ranging between 0° C. and 100° C.,
    stage e) is carried out at a pressure ranging between 0.5 MPa and 10 MPa, and at a temperature ranging between 100° C. and 400° C.

5. A method as claimed in claim 1 wherein, after a predetermined time,
    in stage a), the mercaptans are removed from said gas by contacting with the second amount of adsorbent material,
    in stage b), part of the purified gas obtained in stage a) is contacted with the third amount of adsorbent material, and
    in stage c), the gas fraction comprising water is contacted with the first amount of adsorbent material.

6. A method as claimed in claim 3 wherein, after a predetermined time,
    in stage d), said gas is dehydrated by contacting with the fifth amount of adsorbent material, and
    in stage e), the second part of the purified gas is contacted with the fourth amount of adsorbent material.

7. A method as claimed in claim 6, wherein the adsorbent material making up the fourth and fifth amount has a higher affinity towards water than the material making up the first, second and third amount.

8. A method as claimed in claim 3 wherein, after a predetermined time,
    in stage a), the mercaptans are removed from said gas by contacting with the fifth amount of adsorbent material,
    in stage b), part of the purified gas obtained in stage a) is contacted with the third amount of adsorbent material,
    in stage c), the gas fraction comprising water is contacted with the first amount of adsorbent material,
    in stage d), said gas is dehydrated by contacting with the second amount of adsorbent material, and
    in stage e), the second part of the purified gas is contacted with the fourth amount of adsorbent material.

9. A method as claimed in claim 1, wherein the gas fraction comprises part of a water-laden gas obtained in stage b).

10. A method as claimed in claim 1, wherein the following stage is also carried out:
    f) prior to stage a), deacidizing said natural gas.

11. A method as claimed in claim 10 wherein, in stage c), the gas fraction comprises part of the deacidized gas obtained in stage f).

12. A method as claimed in claim 1, wherein the mercaptan-laden gas obtained in stage c) is washed with a mercaptan-absorbent solution, then the washed gas is recycled.

13. A method as claimed in claims 3, wherein the adsorbent material making up said first, second, third, fourth and fifth amounts comprises at least one of the following materials: a zeolite, an activated alumina type mesoporous adsorbent, and a silica gel type mesoporous adsorbent.

14. A method as claimed in claim 3, wherein the adsorbent material making up said first, second, third, fourth and fifth amounts comprises at least one of the following materials: a type A zeolite, a faujasite X type zeolite, a faujasite Y type zeolite, an activated alumina type mesoporous adsorbent having a BET specific surface area ranging between 150 $m^2/g$ and 800 $m^2/g$, and a silica gel type mesoporous adsorbent having a BET specific surface area ranging between 150 $m^2/g$ and 800 $m^2/g$.

* * * * *